Feb. 16, 1965   L. O. STEBBINS   3,169,393
MEANS AND TECHNIQUES FOR INSPECTING METAL
Filed April 3, 1961   2 Sheets-Sheet 1
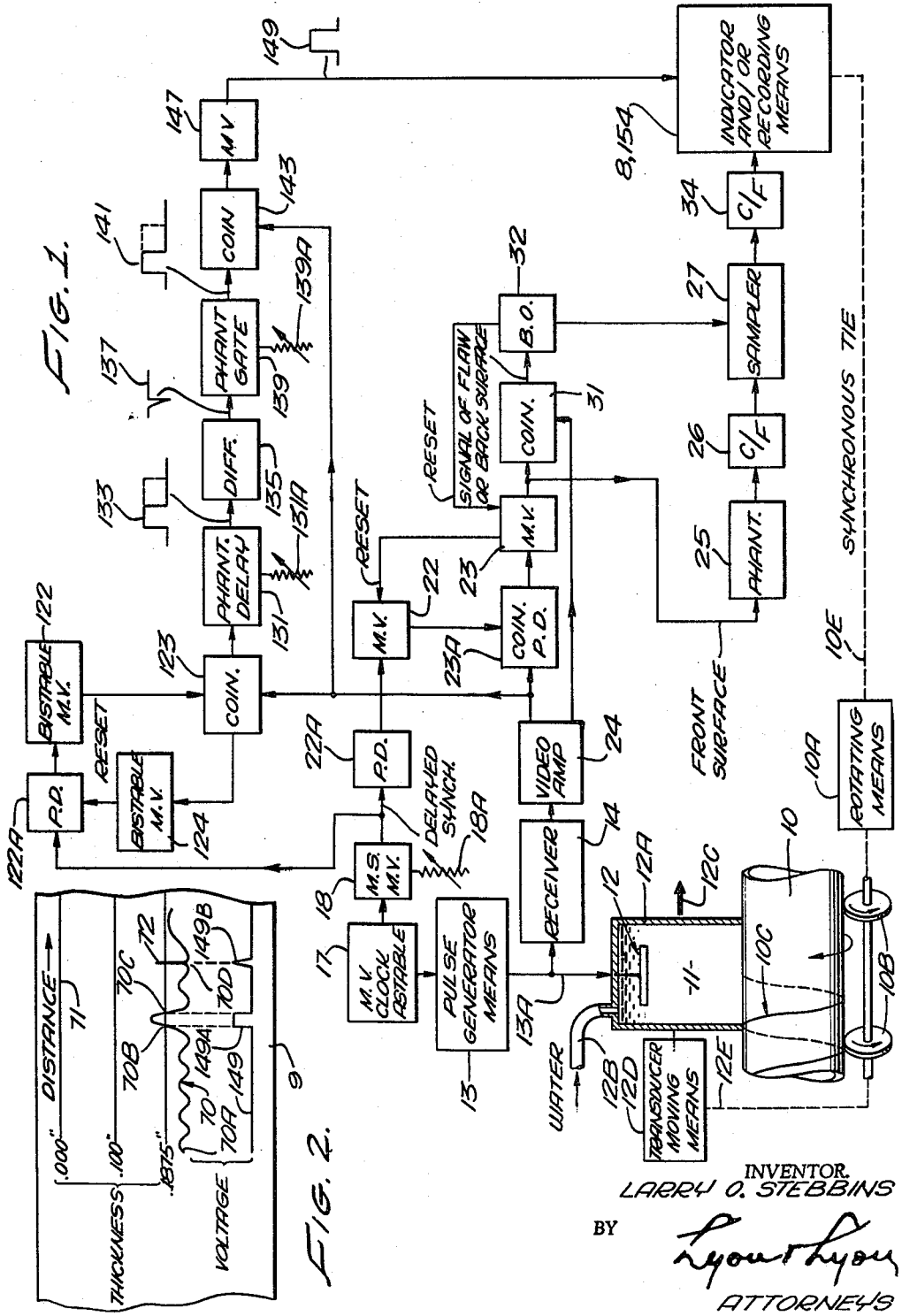
INVENTOR.
LARRY O. STEBBINS
BY
Lyon & Lyon
ATTORNEYS INVENTOR.
LARRY O. STEBBINS
BY Lyon & Lyon
ATTORNEYS United States Patent Office 3,169,393
Patented Feb. 16, 1965

3,169,393
MEANS AND TECHNIQUES FOR
INSPECTING METAL
Larry O. Stebbins, Temple City, Calif., assignor, by mesne assignments, to Automation Industries, Inc., El Segundo, Calif., a corporation of California
Filed Apr. 3, 1961, Ser. No. 100,215
10 Claims. (Cl. 73—67.9)

The present invention relates to a metal inspection system in which a series of time spaced energy pulses are periodically transferred to a metal test piece and the resulting echo signals are observed, indicated or recorded. In particular, the present invention relates to a system for producing a recording of changes in wall thickness of metal pipe alone or in combination with a supplemental recording for more clearly identifying the first-mentioned recording.

These resulting echo signals are from the front and back surfaces of the test piece as well as from those intermediate points or regions where there is an inhomogeneity in the metal. Such inhomogeneity, for example, may be a crack, fissue, blow hole or the like. The recording produced herein, which is essentially for indicating changes in wall thickness, serves also as a means for indicating such homogeneities.

Another aspect of the present invention involves the making of a supplemental recording, correlated with the wall thickness recording, such that those indications as a result of inhomogeneities, on the one hand, may be distinguished from those indications which, on the other hand, are indicative of a wall thickness below a predetermined standard minimum wall thickness.

In achieving this recording of wall thickness, apparatus is provided whereby a sweep voltage is initiated substantially at the time of the reflection from the front surface. The instantaneous value of the sweep voltage at the time of reflection from the back surface is sampled, and a voltage is derived from the sampling process, the last-mentioned voltage being applied to a recording element which records such voltage.

The supplemental recording mentioned above is made on the same recording medium as the wall thickness recording, such supplemental recording being produced by apparatus disclosed herein, and the same is also disclosed and claimed in the copending application of Larry O. Stebbins and Takeo C. Sato, Serial No. 100,217, filed April 3, 1961.

In the production of such recordings, the metal pipe may be rotated about its axis simultaneously with movement of a transducer in a straight line such that the transducer "scans" the rotating pipe in a spiral path. The transducer, which comprises a crystal, is disposed in a housing containing a water column which serves to transfer energy from a crystal to the rotating pipe as well as energy from the rotating pipe back into the crystal. The recording medium on which the recordings are made may be driven synchronously with rotation of the pipe using a synchronous tie between the recording medium and the rotating pipe or such recordings may be made without such synchronous tie.

Another aspect of the present invention involves the making of recordings or indications of inhomogeneities and wall thickness substantially independently of the length of the water column which is subject to change as, for example, vibration during the rotation of the pipe and which would otherwise introduce a changing delay time affecting the wall thickness recording in a manner as to produce false indications of wall thickness. Thus in one form of the present invention, wall thickness indications as well as indications in changes of inhomogeneity are obtained by initiating a reference sweep voltage at the time of, or substantially at the time of the first reflection from the front surface. In another form of the invention disclosed herein, such reference sweep voltage is initiated at or substantially at the time of the first reflection from the back surface so that indications may be made subsequent thereto, i.e. in the time interval between the first reflection from the back surface and the so-called first multiple corresponding to a second reflection from the front surface.

It is therefore an object of the present invention to provide means and techniques whereby the above-indicated results are achieved.

Another object of the present invention is to provide a system of this character wherein indications or recordings are obtained of wall thickness, and particularly changes in wall thickness.

Another object of the present invention is to provide a system of this character wherein a single recording contains indications both of inhomogeneities in the metal as well as its thickness.

Another object of the present invention is to provide a system as indicated in the preceding paragraph whereby the recording mentioned therein may be more accurately analyzed, and particularly more quickly analyzed.

Another object of the present invention is to provide a system of this character wherein inhomogeneities in a metal are indicated or recorded during times subsequent to the first reflection from the back surface of the metal.

Another object of the present invention is to provide a system of this character wherein indications or recordings of wall thickness are produced during a time subssequent to the first reflection from the back surface of the metal.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a dual recording system embodying features of the present invention.

FIGURE 2 illustrates a recording obtained during operation of the system shown in FIGURE 1.

Figure 3:
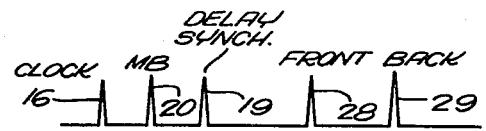
FIGURE 3 illustrates the time relationship between various pulses developed in the system shown in FIGURE 1.

Referring to FIGURE 1, the test piece is illustrated as a pipe 10 which is rotated at a constant speed about its axis by suitable rotating means indicated at 10A and comprising, for example, driven rollers 10B which support the pipe 10 and rotate it.

A crystal 12 is in acoustic relationship with respect to the pipe 10 and is mounted in a housing 12A containing a water stream or water column 11, the water being supplied from conduit 12B via a flexible hose (not shown). This water stream or column 11 acoustically couples the crystal 12 to the test piece 10.

The housing 12A containing the crystal 12 is moved in a straight line which extends generally parallel to the axis of the rotating pipe 10 so that the crystal 12 in effect "scans" the rotating pipe 10 in a spiral path indicated generally at 10C. For these purposes the housing 12A containing crystal 12 may be moved manually in the direction indicated by the arrow 12C at a substantially constant speed or the housing 12A may be moved in the direction 12C in synchronism with rotation of the pipe 10, using suitable means illustrated at 12D for that purpose. Such means 12D may, for example, comprise a lead screw as found on lathes for moving a cutting tool with respect to a rotating work piece; and in this instance such lead screw may be driven in synchronism with the rollers 10B as indicated by the dotted line 12E.

Also in some forms of the invention the recording medium 9 (FIGURE 2) forming a part of the recording means 8,154 may also be driven in synchronism with the movement of the casing 12A using means illustrated in FIGURE 1 as the synchronous tie 10E extending between the rotating means and the recording means 8,154.

During this described movement of the pipe 10 and crystal 12, the crystal 12 is periodically supplied with energy of, for example, 5 megacycles, developed in the pulse-generating means 13 which is connected to the crystal 12 through a lead 13A extending sealingly through casing 12A. The same lead 13A is used to couple the crystal 12 to the receiver 14 for the reception of the resulting echo signals from the front and back surfaces defining the wall thickness of the pipe 10 as well as those echo signals which are due to inhomogeneities in the metal lying between such wall thickness.

For these purposes the pulse-generating means 13 is periodically triggered by so-called clock pulses 16 (FIGURE 3) periodically developed in the clock astable multivibrator 17. An output of the multivibrator 17 is also applied to the monostable multivibrator 18 to initiate a so-called delayed synch pulse 19 (FIGURE 3) which appears later in time than the so-called main bang pulse 20 developed in the generating means 13 and applied to crystal 12.

The multivibrator 18 incorporates adjustable delay means represented by the adjustable resistance 18A to set the time of appearance of the delay synch pulse 19.

The delay synch pulse 19 is applied to the so-called pull-down section 22A of multivibrator 22 to initiate a gating voltage at that time and which is applied to the coincidence section 23A of multivibrator 23 to which is also applied amplified video or echo signals from the output of the video amplifier 24 having its input coupled to the output of receiver 14.

The gate voltage developed in multivibrator 22 is developed during the expectant time of returning echo signals, and when the first video signal, i.e. that signal due to the reflection from the front face of the test piece 10, appears in the coincidence stage 23A contemporaneously with the gating voltage developed in multivibrator 22, a gating voltage is initiated by multivibrator 23. When this occurs, the multivibrator 23 develops a voltage which is applied to the multivibrator 22 as a reset voltage to terminate the gating voltage initially produced by multivibrator 22.

Thus, the gating voltage in multivibrator 23 is initiated by the signal from the front face of the test piece.

Also, a voltage developed in multivibrator stage 23 due to its initiation is applied to the phantastron sawtooth generator 25 which initiates the beginning, at time $T_F$, of the linearly decreasing voltage 25A. It is noted that this time, $T_F$, corresponds substantially to the signal 28 from the front surface of the test piece.

This decreasing voltage 25A is applied through a cathode follower stage 26 to the sampler stage 27, details of which are described later in connection with FIGURE 6.

The output of the multivibrator stage 23 is also applied to the coincidence stage 31 to which is also applied the output from the video amplifier 24. The next video signal following that signal due to reflection from a front face or surface of the test piece results in a signal being developed in the coincidence stage 31, such signal being applied to the blocking oscillator stage 32 to develop a pulse in response to such following signal. This pulse developed in the blocking oscillator stage 32 is applied to the multivibrator stage 23 to terminate the gating voltage developed therein; and such blocking oscillator pulse is also applied to the sampler stage 27.

Figure 5:
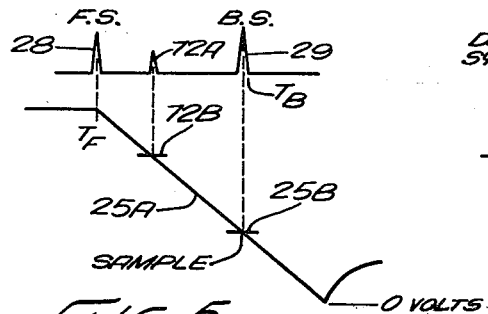
FIGURE 5 illustrates sampling of a sawtooth wave developed either in the system shown in FIGURE 1 or in the modified system illustrated in FIGURE 7.

Thus, under conditions illustrated in FIGURE 5, the blocking oscillator pulse is developed at time, $T_B$, corresponding to the back surface pulse 29. This latter time, $T_B$, corresponds to the instantaneous value of the sawtooth voltage 25A at point 25B. This voltage represented at 25B is applied through cathode follower stage 34 to the recording element of dual-channel indicating and/or recording means 8,154 to produce the trace 70 (FIGURE 2) on the recording medium 9. This voltage represented at 25B is developed at the repetition rate of the system established by multivibrator 17 which is sufficiently fast such that a substantially continuous voltage is developed and applied to the cathode follower stage 34, such continuous voltage, however, varying in accordance with the thickness of the rotating pipe being tested, and since the pipe normally has small thickness variations, this substantially continuous voltage changes normally as indicated in the first portion of trace 70 between points 70A and 70B in FIGURE 2 without necessarily developing a sinusoidal type of variation.

This trace or indication 70 is read with respect to the zero line 71 and on a linear scale due to the linearity of the decreasing voltage 25A which is sampled as previously described. Accordingly, the recording medium 9 may be calibrated in terms of thickness as indicated thereon.

In the inspection of metal pipe having a nominal wall thickness of one-quarter of an inch, the same may be considered as rejectable when there is a 25% reduction in wall thickness from such nominal value of one-quarter of an inch. A 25% reduction corresponds to a thickness of one-sixteenth of an inch.

Thus, when the trace 70 extends above the line having the dimension .1875 inch, there is an indication of excessive thinness. In the circumferential spiral distance represented by the distance between points 70A and 70B, there is sufficient wall thickness, but in the distance corresponding to the distance between points 70B and 70C there is objectionable thinness. Between the points 70C and 70D there is sufficient wall thickness. At point 70D, however, there is an indication 72 of an inhomogeneity in the material between the front and back surfaces of the metal.

Actually, the trace 70 is expanded somewhat for illustrative purposes in the direction designated as "distance." In practice, because of factors of recording medium economy and other factors, the trace 70 is more compressed, thereby rendering it more difficult to distinguish between excessive thinness and inhomogeneity in the material. For this reason, as well as for more speedier interpretation of the results, a supplemental recording or trace 149 is made on the same recording medium 9, correlated with the trace 70.

The particular means for producing the trace 149 is described later herein and is also described and claimed in the above-mentioned copending application of Larry O. Stebbins and Takeo C. Sato.

Before describing these means for producing the trace 149, it is noted that the aforementioned indication 72 in trace 70 is produced when an inhomogeneity, as represented by the signal 72A in FIGURE 5, is of sufficient intensity to trigger the blocking oscillator 32, in which case the blocking oscillator pulse appears in the sampler 27 at the time at which the linearly decreasing voltage represented at 25A in FIGURE 5 has a value or intensity indicated at the point 72B. The voltage at point 72B is of greater intensity than the voltage at 25B, with the result that indication 72 is sharply pronounced. The same, however, is in the nature of a straight vertical line instead of a rounded portion as is the trace between the points 70B and 70C and this of itself allows some distinction to be made in interpretation of trace 70. However, for purposes of making this distinction more noticeable and more discernible, the supplemental trace 149 is made on the same recording medium 9.

The means for producing the trace 149 includes elements in FIGURE 1 which have reference numerals in the 100 series. For ease of comparison of the disclosure herein with the disclosure in the aforementioned copending application, the same elements herein as in the copending application are identified by the same reference numeral raised, however, by 100.

Figure 4:
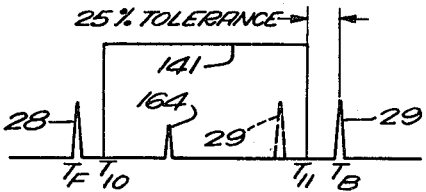
FIGURE 4 illustrates the time relationship of various pulses and a gating voltage developed in the system shown in FIGURE 1 for producing the so-called supplemental recording.

Thus, referring to FIGURE 1, the delayed synch pulse developed in the monostable multivibrator 18 is applied to the pull-down section 122A of bistable multivibrator 122 which at that time initiates a gating voltage. Such gating voltage developed in the bistable multivibrator 122 is applied to the coincidence stage 123, to which is also applied the video train from the video amplifier 24. A signal corresponding to the first reflection from the front surface of the pipe, acting jointly with the gating voltage supplied by the multivibrator 122 causes a signal to be developed in the coincidence stage 123. The resulting change in the coincidence stage 123 produces a voltage which is applied to the bistable multivibrator 124 for developing a reset pulse which is applied to the pull-down section 122A to restore the bistable multivibrator 122 to its original quiescent condition. Also, this changed condition of the coincidence stage 123 produces a voltage which is applied to the phantastron delay multivibrator 131 for initiating the gate voltage 133. The time duration of such gating voltage 133 may be adjusted by adjustment of conventional means incorporated in the phantastron 131 and represented by the adjustable resistance 131A. Thus the gating voltage 133 has its leading edge initiated in accordance with the signal from the front surface of the pipe. The trailing edge of pulse 133 is differentiated in the succeeding differentiator stage 135 to produce the negative going spike 137 in its output and the same is applied to the phantastron gate generator 139, also having adjustable means for establishing the length of the gate, such adjustable means being represented by the adjustable resistance 139A. As a result, a gating voltage 141, represented also in FIGURE 4, is applied to the coincidence stage 143 together with the video train from the video amplifier 24. It will be observed that the gating voltage 141 has its leading edge initiated at a time $T_{10}$ which is shortly after occurrence of the signal 28 corresponding to a reflection from the front face at time $T_F$. Such leading edge of voltage 141 is adjusted by adjustment of the phantastron delay 131 using adjustment 131A. The trailing edge of the gating voltage 141 terminates a predetermined time interval before the signal 29 corresponding to the reflection from the back surface of a wall thickness of nominal one-quarter inch. As illustrated in FIGURE 4, the time interval between $T_{11}$ and $T_B$ corresponds to a 25% tolerance or a distance in the metal of one-sixteenth of an inch. When the wall thickness is outside of that tolerance, i.e. is thinner than 25%, the reflection from the back surface produces a pulse also identified by the reference numeral 29 within the time interval $T_{10}-T_{11}$, and such pulse 29 representing excessive thinness produces a coincident condition in the coincidence stage 143 with the result that a signal is developed and applied to the multivibrator stage 147 to develop the pulse 149 applied to the supplemental recording channel in the recording means 8,154 to produce the noticeable indication 149A in the otherwise straight line trace 149. Such indication 149A corresponds to the region or distance between the points 70B and 70C in trace 70.

It will also be observed that should there be some inhomogeneity in the material, the same produces a signal represented at 164 in FIGURE 4 (corresponding to 72A in FIGURE 5) and such signal 164 occurring simultaneously with the gating voltage 141 produces a coincident condition in coincidence stage 143 to initiate the pulse 149 in multivibrator stage 147, such pulse also being applied to the recording means 8,154 to produce a corresponding indication 149B in trace 149, such latter indication 149B corresponding to the indication 72 in trace 70. The relative widths of the indications 149A and 149B in trace 149 allows one to distinguish between excessive thinness and inhomogeneity in the metal. This is so since if there is an excessive thinness, the same appears along a longer circumferential portion of the pipe than does usually an inhomogeneity in the material. Also the echo pulse from the back surface is usually of larger amplitude and hence of broader base, measured along the time axis, than a small amplitude signal having a corresponding smaller base developed from a small inhomogeneity so that the shape of the resulting recordings 149A, 149B, as seen in FIG. 2, may be used in distinguishing excessive thinness from inhomogeneity.

Figure 6:
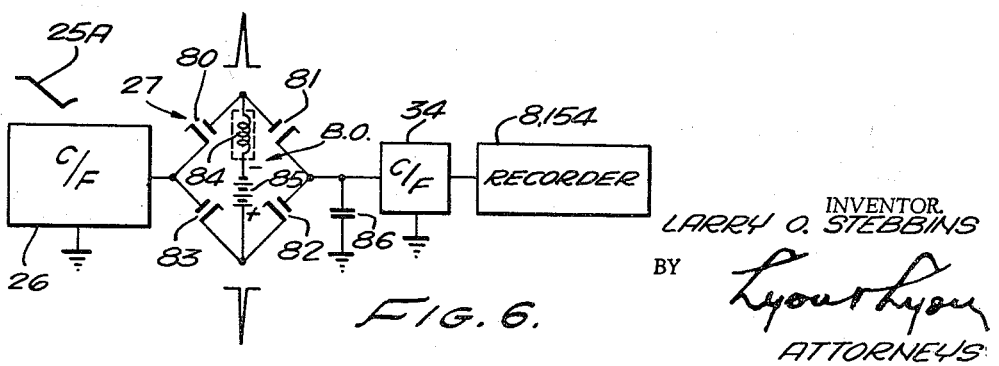
FIGURE 6 illustrates in more detail the sampler designated as such in FIGURE 1.

The sampler 27 in FIGURE 1 may take the form illustrated in FIGURE 6. The same comprises generally four biased diodes 80, 81, 82 and 83 arranged generally in a bridge circuit with the anodes of diodes 80 and 81 being interconnected, the cathodes of diodes 82 and 83 being interconnected, the cathode of diode 81 being connected to the anode of diode 82, and the cathode of diode 80 being connected to the anode of diode 83. The voltage variation 25A appearing in the cathode follower stage 26, appears between a ground point and the cathode of diode 80 as well as the anode of diode 83. The blocking oscillator pulse developed in the blocking oscillator stage 32 appears in the winding 84 which forms a part of the blocking oscillator stage, such winding 84 having one of its terminals connected to the interconnected anodes of diodes 80 and 81 and the other one of its terminals connected to the negative terminal of the bias voltage source 85 which has its positive terminal connected to the interconnected cathodes of diodes 82 and 83. The cathode of diode 81 and the anode of diode 82 are connected to the ungrounded terminal of the smoothing or integrating capacitor 86, such ungrounded terminal of capacitor 86 being connected to the input circuit of the cathode follower stage 34 having its output applied to the recorder 8,154. For these purposes it is preferred that the sampler include only one blocking oscillator winding as illustrated in FIGURE 6. The appearance of a pulse in winding 84, greater in amplitude than the voltage of source 85, renders the diodes conducting to produce a voltage across capacitor 86, such voltage developed across capacitor 86 being determined by the particular value of voltage of the sawtooth source 26 which exists at the time of appearance of the blocking oscillator pulse which, of course, is of relatively small duration. This voltage developed across capacitor 86 appears at the repetition rate of the system and is integrated by the inherent storage capabilities of the capacitor such that a substantially continuous recordable voltage is developed across the capacitor.

Referring to the modification illustrated in connection with FIGURES 7 and 8, the same is for purposes of producing a recording such as the recording 70 in FIGURE 2 but with respect to time intervals between the reflection from the back surface and the next succeeding reflection from the front surface indicated as the first multiple in FIGURE 8. For these purposes the arrangement shown in FIGURE 1 is modified to include two additional elements indicated in dotted lines in FIGURE 7, namely a multivibrator stage 90 and a coincidence stage 91. Also, the reset voltage developed in multivibrator stage 23 and appearing on lead 93 is now applied to the newly added multivibrator stage 90 for purposes of resetting it (instead of to the multivibrator 22 as shown in FIGURE 1). Also, the multivibrator stage 22 in FIGURE 7 is now reset by a reset voltage developed in the multivibrator stage 90 and applied to the multivibrator stage 22 over connection 94.

Figure 8:
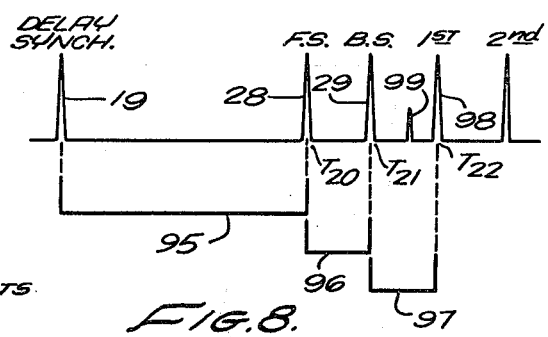
FIGURE 8 illustrates the time occurrence of pulses and gating voltages developed in the modified system shown in FIGURE 7.
Figure 7:
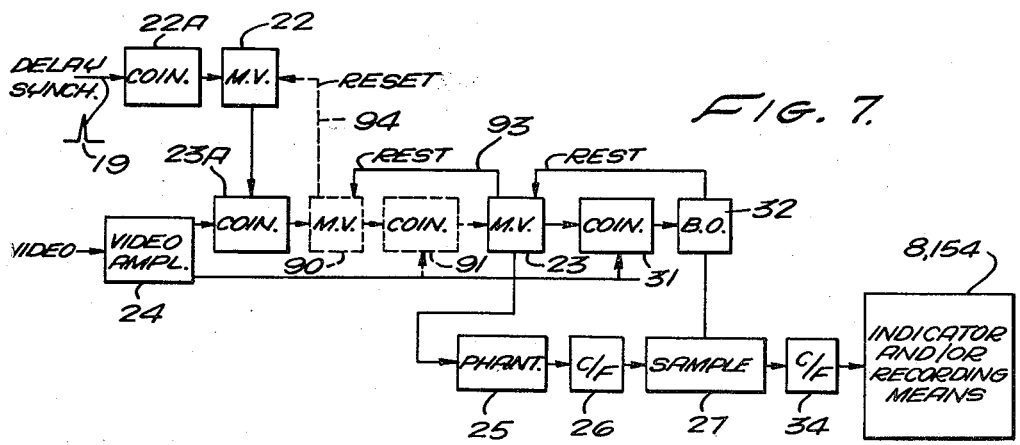
FIGURE 7 illustrates the modified form of the present invention.

In FIGURE 7 the multivibrator 22 produces a gating or tying voltage 95 which is initiated by the delay synch signal 19 and which is terminted by a signal corresponding to the reflection from the front surface indicated by the signal 28 in FIGURE 8 appearing at time $T_{20}$. At this time the gating voltage 96 is initiated in multivibrator stage 90 and such gating voltage 96 is terminated at time $T_{21}$ corresponding to the first reflection from the back surface of the metal as indicated by the signal 29 in FIGURE 8, the same being accomplished due to establishment of a coincident condition between the signal from the back surface applied to coincidence stage 91 and the gating voltage 96 also applied to the coincidence stage 91. As a result of this last-mentioned coincident condition, a voltage is developed in the coincidence stage 91 which is applied to the multivibrator stage 23 to initiate the gating voltage 97 in multivibrator stage 23, the same being initiated at time $T_{21}$ and being terminated at time $T_{22}$ as a result of the reset pulse supplied to multivibrator stage 23 from the blocking oscillator stage 32, the blocking oscillator stage 32 being triggered as a result of a coincident condition in coincidence stage 31 between such gating voltage 97 and the signal applied to coincidence stage 31 corresponding to the first multiple signal 98. It is noted also that this gating voltage 97 may be terminated prior to time $T_{22}$ as a result of a signal produced due to an inhomogeneity in the material and appearing as, for example, the signal 99 in the time interval between the reflection from the back surface and the first multiple signal 98.

Such signal 98 or 99, as the case may be, produces a coincident condition in the coincidence stage 31 to trigger the blocking oscillator stage 32 for purposes of sampling the sawtooth voltage 25A (FIGURE 5) developed in the phantastron voltage generator 25 and applied through cathode follower stage 26 to the sampler stage 27, the voltage wave 25A in the arrangement shown in FIGURE 7 being initiated at the time $T_{21}$ indicated in FIGURE 8, i.e. at the time of initiation of the gating voltage in the multivibrator stage 23 in FIGURE 7.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an ultrasonic inspection system of the character described, a test piece having a front and a back surface; ultrasonic energy pulse-generating means; a transducer coupled to said pulse-generating means and to said test piece; means periodically operating said pulse-generating means; means coupled to said transducer for amplifying video signals representative of reflections from said front and back surfaces; means coupled to said operating means for producing a voltage wave; a first coincidence stage coupled to said amplifying means and to said voltage-wave-producing means and functioning to produce a first signal upon time coincidence of said voltage wave and one of said video signals; a sweep-generating means coupled to said coincidence stage and receptive to said signal produced therein for developing a sweep voltage; a sampler stage coupled to said sweep generator; a second coincidence stage coupled to said amplifying means and to said first coincidence stage and functioning to produce a second signal upon coincidence condition between said first signal and a succeeding one of said video signals which succeeds the first-mentioned video signal; means coupling said second coincidence stage to said sampler stage for producing a voltage in said sampler stage representative of the time spacing between the first and second-mentioned video signals; and means producing a recording representative of said voltage developed in said sampler stage.

2. A system as set forth in claim 1 in which said first video signal is representative of the reflection from the front surface of said test piece.

3. A system as set forth in claim 1 in which said first video signal is representative of the reflection from the back surface of said test piece.

4. A system as set forth in claim 1 including additional means coupled to said video signal amplifying means and responsive to the time spacing between said first and second video signals when the time spacing therebetween is less than a predetermined time interval corresponding to a predetermined thickness of the test piece for producing an indication.

5. In an ultrasonic system of the character described wherein a test piece has ultrasonic energy transmitted thereto for developing resulting video echo signals as a result of reflections from the front and back surfaces as well as a result of inhomogeneities in the test piece, means producing a sawtooth wave in response to one of said echo signals, sampling means coupled to said sawtooth generating means, means responsive to an echo signal which succeeds that echo signal which operates the sawtooth generating means for producing a voltage in said sampling means, and means producing a recording representative of said voltage.

6. A system as set forth in claim 5 including additional means coupled to receive said echo signals and developing a voltage when the time spacing between the first and second echo signals is less than a predetermined amount, and means recording the last-mentioned voltage.

7. In an ultrasonic inspection system of the character described, a transducer for transmitting ultrasonic energy pulses to a test piece and for receiving resulting echo signals therefrom representative of reflections from the front and back surfaces of the test piece as well as a result of inhomogeneities in a test piece; pulse-generating means coupled to said transducer; a source of timing pulses coupled to said pulse-generating means; first means coupled to said source of timing pulses for initiating a first voltage wave in response to one of said timing pulses; receiving means coupled to said transducer for amplifying said echo signals; a first coincidence stage coupled to said receiving means and to said first means and functioning to produce a first signal upon time coincidence of said voltage wave and one of said echo signals; second means coupled to said coincidence stage for producing a second voltage wave in response to said first signal; a sawtooth voltage generator coupled to said second means for initiating a sawtooth wave in response to said first signal; a sampler stage coupled to said sawtooth voltage generator; a second coincidence stage coupled to said receiving means and to said second means and functioning to develop a second signal upon coincident condition between said second voltage wave and an echo signal which succeeds the previously mentioned echo signal; a blocking oscillator stage coupled to said sampler stage and operated by said second signal for producing a voltage in said sampler stage; and means producing a recording representative of said voltage developed in said sampler stage.

8. A system as set forth in claim 7 including third means coupled to said source of timing pulses and developing a third voltage wave in response to one of said timing pulses; a third coincidence stage coupled to said third means and to said receiving means for developing a third signal upon coincidence between said third voltage wave and the first-mentioned video signal; fourth means coupled to said third coincidence stage and producing a fourth voltage wave in response to said third signal; a fourth coincidence stage coupled to said fourth means and to said receiving means and functioning to develop a fourth signal upon coincidence of said fourth voltage wave and said succeeding echo pulse; and means coupled to said fourth coincidence stage and responsive to said fourth signal for producing a recording.

9. A system as set forth in claim 8 in which said test piece is a pipe; means for rotating said pipe about its axis; means moving said transducer in a direction generally parallel to the axis of said pipe when the same is being rotated by said rotating means.

10. A system as set forth in claim 9 in which the first and second-mentioned recording means includes a recorder having a single recording medium, and means moving said recording medium in timed relationship with respect to rotation of said pipe.

References Cited in the file of this patent
UNITED STATES PATENTS

| | | |
|---|---|---|
| 2,770,966 | Halliday et al. | Nov. 20, 1956 |
| 2,781,445 | Stocker | Feb. 12, 1957 |
| 2,836,059 | Beaujard | May 27, 1958 |
| 2,883,860 | Henry | Apr. 28, 1959 |
| 2,888,824 | Henry | June 2, 1959 |
| 3,006,184 | Goldman | Oct. 31, 1961 |
| 3,041,872 | Brown et al. | July 3, 1962 |

OTHER REFERENCES

Periodical Instrument Practice, article entitled "Ultrasonic Automation—The Autosonic System," pp. 353–356 of April 1957 issue.

Nondestructive Testing Handbook, vol. II, published 1959 by The Ronald Press Co., pp. 22–24 of Sec. 46.